US009943066B2

(12) United States Patent
Zhao et al.

(10) Patent No.: US 9,943,066 B2
(45) Date of Patent: Apr. 17, 2018

(54) GESTURE CONTROL AND DIRECTIONAL FORCE ON REMOTE OBJECT BASED ON SMART WEARABLE

(71) Applicant: Samsung Electronics Co., Ltd., Suwon-si, Gyeonggi-do (KR)

(72) Inventors: Chenxi Zhao, Seattle, WA (US); Zhiyun Li, Kenmore, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 14/690,864

(22) Filed: Apr. 20, 2015

(65) Prior Publication Data

US 2016/0302386 A1     Oct. 20, 2016

(51) Int. Cl.
| | |
|---|---|
| *A01K 15/02* | (2006.01) |
| *G06F 3/01* | (2006.01) |
| *G08B 6/00* | (2006.01) |
| *A01K 3/00* | (2006.01) |
| *A01K 27/00* | (2006.01) |
| *G01S 19/14* | (2010.01) |
| *G06F 1/16* | (2006.01) |
| *G06F 3/0488* | (2013.01) |

(52) U.S. Cl.
CPC .............. *A01K 15/021* (2013.01); *A01K 3/00* (2013.01); *A01K 27/001* (2013.01); *A01K 27/003* (2013.01); *A01K 27/009* (2013.01); *G01S 19/14* (2013.01); *G06F 1/1694* (2013.01); *G06F 3/016* (2013.01); *G06F 3/017* (2013.01); *G06F 3/04883* (2013.01); *G08B 6/00* (2013.01); *G06F 2200/1637* (2013.01)

(58) Field of Classification Search
CPC ..... G06F 1/1613; A01K 15/02; A01K 15/021; A01K 15/023; A01K 27/009
See application file for complete search history.

(56) References Cited

U.S. PATENT DOCUMENTS

| | | | | |
|---|---|---|---|---|
| 6,196,990 | B1 * | 3/2001 | Zicherman | A61H 23/0254 604/29 |
| 6,980,114 | B2 * | 12/2005 | Kleinschmidt | A61B 5/0002 340/539.17 |
| 2003/0116099 | A1 * | 6/2003 | Kim | A01K 15/021 119/719 |
| 2007/0204804 | A1 * | 9/2007 | Swanson | A01K 15/023 119/721 |
| 2012/0247397 | A1 | 10/2012 | Lvovskiy et al. | |
| 2015/0075446 | A1 | 3/2015 | Hu | |

FOREIGN PATENT DOCUMENTS

EP        2 439 612 A2     4/2012

* cited by examiner

*Primary Examiner* — Monica L Williams
(74) *Attorney, Agent, or Firm* — Jefferson IP Law, LLP

(57) ABSTRACT

An apparatus for gesture control and directional force on remote object based on smart wearable is provided. The apparatus includes a sensor configured to detect a user's gesture, a communication unit, and a controller configured to generate a command for a virtual leash based on the detected gesture, and to control the communication unit to transmit the command to a collar of a pet.

13 Claims, 3 Drawing Sheets

GESTURE CONTROL AND DIRECTIONAL FORCE ON REMOTE OBJECT BASED ON SMART WEARABLE

TECHNICAL FIELD

The present disclosure relates to an apparatus and method for mobile or wearable devices. More particularly, the present disclosure relates to an apparatus and method for generating directional force on remote object through a mobile or wearable device or mobile terminal, such as a virtual leash.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Mobile devices are also being adapted to be worn on the body. For example, several companies are developing smart watches, which are designed to be worn on the arm as a watch, and which provide many of the features typically associated with a mobile device, such as telephone, clock, and calendar programs. Many of these smart watches or wearable devices are designed to interface with a mobile device.

In the context of pets, many 'virtual fence' or pet tracking solutions are available. The pet tracking solutions typically include a GPS chip installed in a device attached to the pet, such as a collar. The collar also includes a communication unit that reports the pet's location to the user. Virtual fences use a collar capable of vibrating or applying an electric shock to the pet. The user sets up a perimeter for the virtual fence. When the pet moves to the edge of this perimeter, the device applies the vibration or shock to the pet in an attempt to inhibit the pet from moving beyond the perimeter which the user has set up.

However, these solutions, especially the virtual fence, can be considered inhumane. Deliberately shocking a pet can easily be considered an act of cruelty. This type of severe negative reinforcement is also not generally a good means of training a pet.

SUMMARY

Aspects of the present disclosure are to address at least the above-mentioned problems and/or disadvantages and to provide at least the advantages described below. Accordingly, an aspect of the present disclosure is to provide an apparatus and method for generating directional force on remote object through a mobile or wearable device or mobile terminal, such as a virtual leash.

In accordance with an aspect of the present disclosure, a mobile device is provided. The mobile device includes a sensor configured to detect a user's gesture, a communication unit, and a controller configured to generate a command for a virtual leash based on the detected gesture, and to control the communication unit to transmit the command to a collar of a pet.

In accordance with another aspect of the present disclosure, a smart collar is provided. The smart collar includes an inner layer, an outer layer, a plurality of force generation devices arranged on the inner layer and the outer layer, a communication unit configured to receive a command from a mobile device, and a controller configured to control the plurality of force generation devices to generate a force based on the received command.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
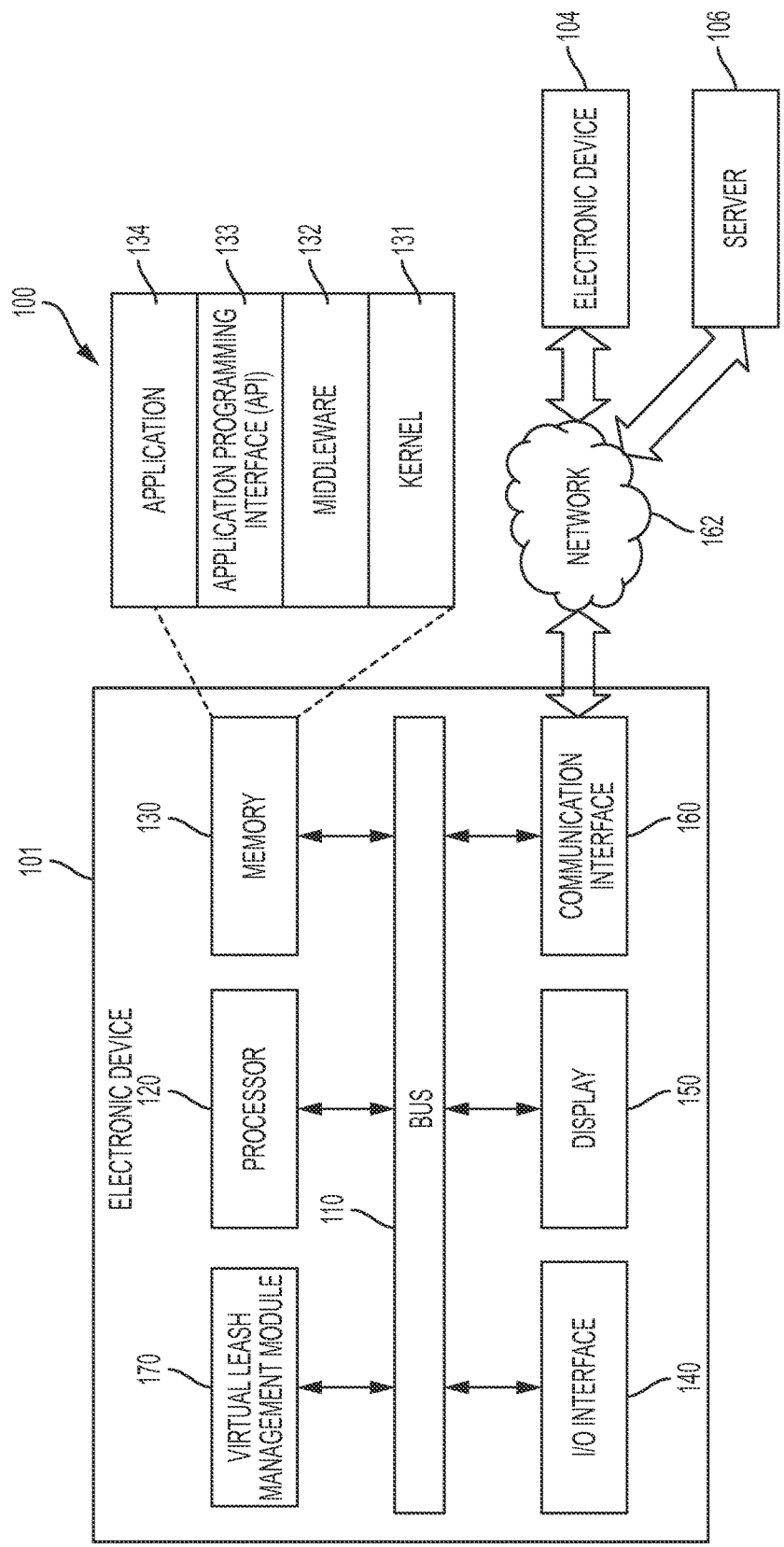
FIG. 1 illustrates a mobile device according to an embodiment of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for a virtual leash.

FIG. 1 illustrates a network environment including a mobile device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a virtual leash module 170, and/or the like. The electronic device may be mobile device such as a smartphone, or a wearable device such as an armband, bracelet, watch, or ring.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the virtual leash module 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the virtual leash module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the virtual leash module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the virtual leash module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between electronic device 101 and one or more external electronic devices (e.g., the electronic device 104, the server 106, and/or the like). For example, the communication interface 160 may communicate with the external electronic device by establishing a connection with a network 162 using wireless or wired communication. According to an exemplary embodiment of the preset disclosure, the external electronic device may include collar, such as the collar described below with respect to FIG. 2.

The wireless communication may be at least one of Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WD-CMA), Universal Mobile Telecommunications System (UMTS), Wireless Broadband (WiBro), Global System for Mobile Communications (GSM), and/or the like), Infrared Data Association (IrDA) technology, and/or the like. The wired communication may be at least one of Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between electronic device 101 and an external electronic device may be supported by, for example, at least one of the application 134, the API 133, the middleware 132, the kernel 131, the communication interface 160, and/or the like.

The virtual leash management module 170 may, for example, process at least a part of information received from other components (e.g., the processor 120, the memory 130, the I/O interface 140, the communication interface 160, and/or the like), and provide various information, services, and/or the like to the user in various manners. For example, the virtual module 170 may control via the processor 120 or independently at least some of the functions of the electronic device 101 to communicate or connect to another electronic device (e.g., the electronic device 104, the server 106, and/or the like).

The virtual leash management module may operate in several modes. In a virtual leash mode, the virtual leash is configured to detect the user's gesture and provide a signal to the virtual leash so that the virtual leash will react in a manner consistent with the gesture. For example, if the user makes a gesture of pulling back with the user's arm or hand, the virtual leash attached to the pet, the virtual leash receives the command from the mobile device and generates a force consistent with that of someone pulling on the pet's leash. Various examples of gestures are described below with respect to FIG. 3.

In a fence mode, the virtual leash management module 170 transmits a signal to the collar to apply pressure when the pet moves too far away from the user. This keeps the pet within a certain distance from the user without requiring a physical leash. The virtual leash management module may also operate in a hybrid mode, combining the features of the fence mode and the virtual leash mode, or in a training mode, where the virtual leash management module learns the user's gestures in order to control the collar.

In addition, the mobile device 101 may also include one or more sensors to measure the movement of the mobile device 101 and determine the user's gestures. These sensors may include, for example, an accelerometer, a gyroscope, and the like.

Figure 2:
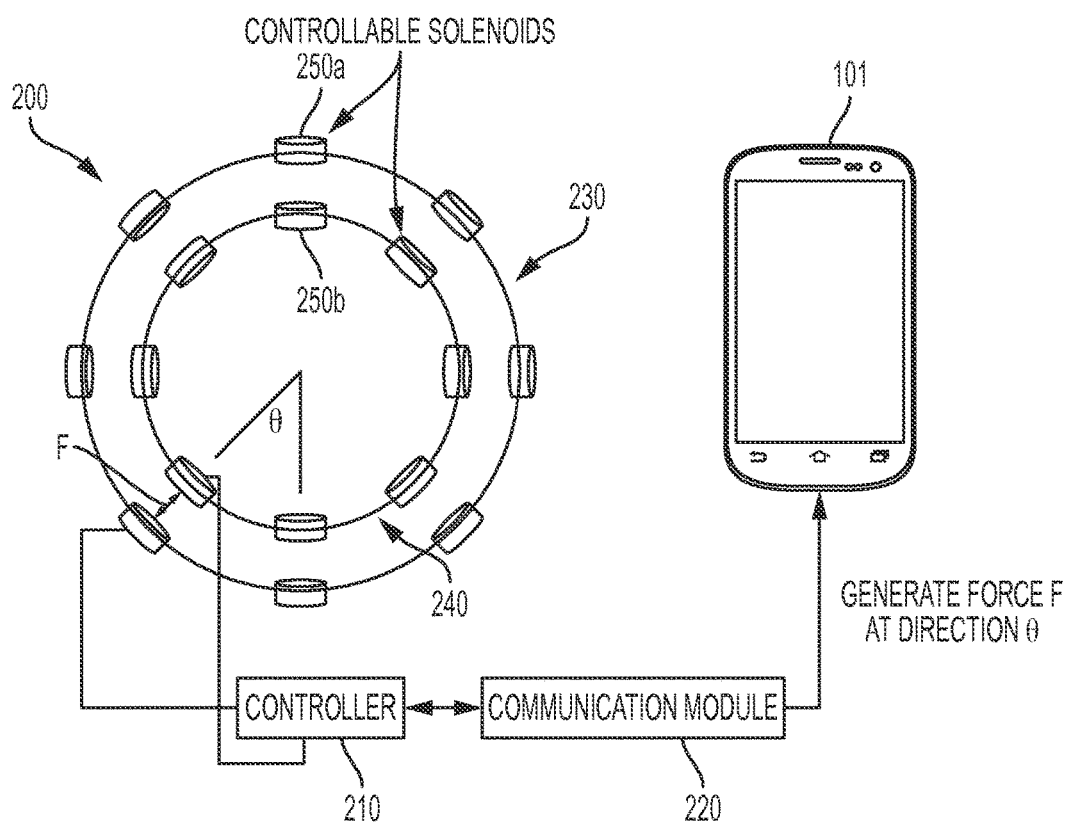
FIG. 2 illustrates a virtual leash system according to an embodiment of the present disclosure.

FIG. 2 illustrates a virtual leash system according to an embodiment of the present disclosure.

Referring to FIG. 2, the virtual leash system includes the mobile device 101 and a collar 200. The collar 200 includes a controller 210 and a communication module 220. The collar is formed of an outer layer 230 and an inner layer 240. Although not shown, the collar may also include a GPS unit.

The outer layer 230 and the inner layer 240 may be formed of any appropriate material for a dog (pet) collar. Although FIG. 2 only shows two layers, the collar may also include additional layers (not shown). According to an exemplary embodiment of the present disclosure, the outer layer 230 may formed of a material that is less flexible than the material making up the inner layer 240.

The collar also includes a force generation unit which generates the force in response to the user's gestures with the mobile device 101. According to an exemplary embodiment, the force generation unit may include a plurality of solenoids 250a and 250b. The solenoids 250a may be arranged in pairs, with one solenoid of each pair on the outer layer 230, and the other solenoids on the inner layer 240, as shown in FIG. 2. The controller generates a current to the solenoids to change the polarity of the solenoid pairs. The resulting attraction or repulsion due to the magnetic field generates a force F, which is felt by the dog wearing the collar 200.

The communication module 220 communicates with the mobile device 101. The communication module 220 may receive commands and other information to control the collar 200 to generate a force according to the particular command received. The communication module 220 may use any wireless communication standard, including Wi-Fi, Bluetooth, NFC, or cellular communication technologies.

The commands received from the mobile device 101 may include a command to switch to a particular operation mode, such as virtual leash or virtual fence. While the collar 200 is operating in the virtual leash mode, the communicate module 220 may also receive a command from the mobile device 101 indicating a force vector F to apply to the collar 200. The force vector F may include a magnitude (strength) component and a direction component θ.

The controller 210 controls overall operations of the collar 200. The controller controls the magnetic field generated by the solenoids 250a and 250b according to the commands received from the mobile device 101 via the communication module.

When the collar 200 is operating in the virtual leash mode, the collar 200 may receive commands from the mobile device 101 corresponding to the user's gesture with the mobile device 101. This command may include the force vector F including the magnitude and the direction components. In some cases, the magnitude may be omitted, and the magnitude may be determined based on the distance between the collar 200 and the mobile device 101 or a strength of the signals from the mobile device 101 that are received at the communication module.

Once the controller determines the magnitude and strength of the force to be applied, the controller determines the axis and angle of the force to be applied by the collar 200. The axis may be provided through a GPS module included in the collar 200, or may be provided from the mobile device 101. The angle may be the direction component received from the mobile device 101.

The controller 220 then controls the solenoids 250a and 250b to generate the corresponding force. For example, the controller may control a pair of the solenoids 250a and 250b to have opposite magnetic poles. The pair will thus be attracted to each other, generating a force along a line between the solenoid on the outer layer 230 and the solenoid on the inner layer 250. The strength of the field may depend on the magnitude (strength) of the force F to be generated. In addition, the controller may activate other solenoids to provide an additional force to the collar 200.

While the collar 200 is operating in the virtual fence mode, the controller may receive from the mobile device 101, a maximum allowable distance from the user that the pet. As with the virtual leash mode, the distance may be determined based on a signal strength of the communications with the mobile device 101, or other localization methods, such as GPS, Bluetooth Low Energy, and the like.

When the controller determines that the pet is approaching the maximum allowable distance, the controller 220 controls the solenoids 250a and 250b to generate a force to keep the pet within the maximum distance. The direction in this case may be a direction back toward the mobile device 101. The magnitude (strength) may depend upon the distance to the maximum allowable distance. For example, the magnitude of the force may be small when the collar 200 (and, by extension, the pet) is relatively further away from the maximum distance, and increase as the pet moves closer to the maximum allowable difference. The distance at which the controller begins to exert the force F may be set by the user.

In addition to the virtual leash and virtual fence modes, the collar 200 may also operate in a hybrid mode incorporating features of both modes. In the hybrid mode, the controller 220 generates a force automatically as the pet approaches the maximum allowable distance, and also generates a force according to commands received by the mobile device 101.

Finally, the virtual leash system may also operate in a training mode. The training mode allows the virtual leash system to collect training set data to improve gesture detection. The training mode may also allow the user to define the actions corresponding to particular gestures. The training mode also enables the system to improve gesture detection. For example, the user may move the mobile device around and indicate when a particular motion should be interpreted as a gesture. The user may confirm that a particular motion is a gesture based on confirmation input, including touching a user interface element or through voice commands. This reduces the prevalence of false positives, where the virtual leash management module 170 detects a gesture that the user did not intend to make.

Figure 3:
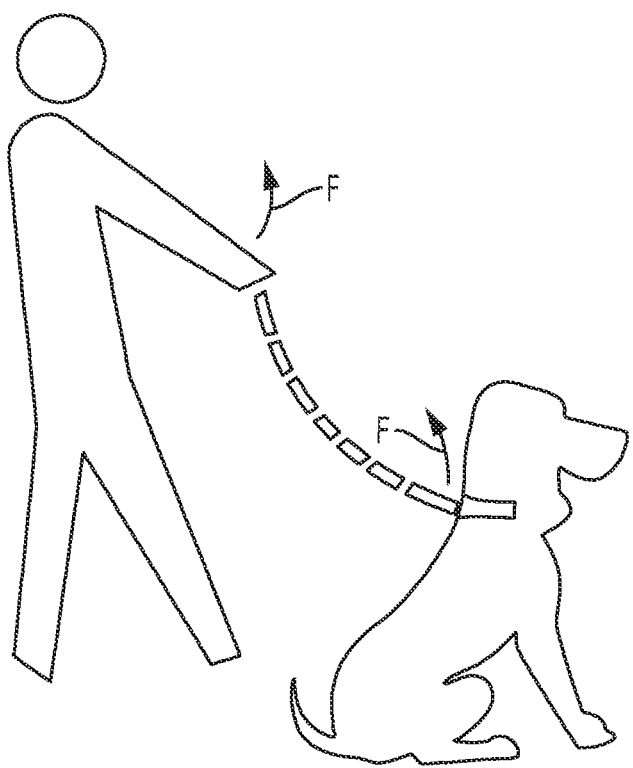
FIG. 3 illustrates gesture control in a virtual leash system according to various embodiments of the present disclosure.

FIG. 3 illustrates gesture control in a virtual leash system according to various embodiments of the present disclosure.

Referring to FIG. 3, the user is holding the mobile device 101 and the pet (a dog, in this example) is wearing the collar 200. In FIG. 3, the mobile device 101 may be a mobile device, such as a smart phone, or a wearable device, such as a watch, armband, bracelet, or ring. In both cases, the mobile device 101 detects the user's gestures and forwards the appropriate commands to the collar 200.

The virtual leash management module 170 detects the user's gestures via a sensor included in the mobile device, and transmits corresponding commands to the controller 220 of the collar 200. To determine whether a movement of the mobile device 101 is a gesture command, the virtual management leash module may refer to training set data or other data collected during the training mode, as well as pre-set training data. This data may be used to set a gesture threshold. If the movement of the mobile device 101 is below this gesture threshold, the virtual leash management module 170 does not interpret the motion as a gesture. If the movement is at or above the threshold, then the virtual leash management module interprets the motion as a gesture and generates the appropriate command for the collar 200.

The strength or speed of the gesture may be used to determine the strength of the force applied to the collar 200. For example, if the user makes a slow gesture, the virtual leash management module 170 may send a signal to the collar 200 to apply a lower force. On the other hand, if the gesture is relatively fast, the strength included in the signal may be higher, so that a higher force is applied to the collar 200. To avoid injuring the pet, a maximum strength may be set, which provides the highest force that will be applied to the collar. The maximum strength may vary based on the particular size, breed, or species of pet.

The gestures may include a motion to the left or right, or a pulling back motion. For the left to right motion, the virtual leash Management module 170 generates a command for the collar 200 to generate a force in the corresponding direction, as if the user were holding an actual leash (shown in the dotted lines). In response to the pull back gesture, the collar 200 generates a force in the direction of the user, so that the pet will be pulled back towards the user. The direction of the user, corresponding to the facing of the pet, could be determined by the sensor, such as GPS, in the collar 200 on the pet and in the mobile device 101.

Through the use of gesture control, the mobile device 101 and the collar 200 interface to provide a virtual leash through which a user may control a pet. Because the system does not include a physical leash, many of the problems of traditional leashes are avoided. For example, the virtual leash cannot get tangled in obstacles. In addition, the pet is allowed a larger range to move around, and is not limited by the physical leash.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A mobile device, comprising:
   a sensor configured to detect a user's gesture;
   a transceiver; and
   at least one processor configured to:
     determine whether the mobile device is operating in a virtual leash mode or a virtual fence mode,
     when the mobile device is operating in the virtual leash mode, generate a command to control solenoids of a pet collar based on the detected gesture,
     when the mobile device is operating in the virtual fence mode, generate a command to control the solenoids of the pet collar based on a distance between the mobile device and the pet collar, and
     control the transceiver to transmit the command to the pet collar of a pet.

2. The mobile device of claim 1, wherein the command comprises a force vector of a force to be applied to the pet via the collar.

3. The mobile device of claim 2, wherein the force vector includes a strength of the force to be applied.

4. The mobile device of claim 3, wherein the force vector includes a direction of the force to be applied.

5. The mobile device of claim 4, wherein the direction of the force to be applied corresponds to a direction of movement of the gesture.

6. The mobile device of claim 4, wherein the strength of the force to be applied corresponds to a speed of the gesture.

7. The mobile device of claim 1, wherein the mobile device is a wearable device designed to worn on the user's body.

8. The mobile device of claim 7, wherein the wearable device is in the form of one of a watch, a bracelet, an armband, a ring, and a glove.

9. The mobile device of claim 1, wherein the at least one processor is further configured to receive, via user input, a maximum distance the pet is permitted to roam from the mobile device, and to transmit the maximum distance to the collar.

10. A method of controlling a pet collar by a mobile device, the method comprising:
   determining whether the mobile device is operating in a virtual leash mode or a virtual fence mode;
   when the mobile device is operating in the virtual leash mode:
     detecting, by a mobile device, a user's gesture, and
     generating, by the mobile device, a command to control solenoids of the pet collar based on the detected gesture;
   when the mobile device is operating in the virtual fence mode, generate the command to control the solenoids of the pet collar based on a distance between the mobile device and the pet collar; and
   controlling the mobile device to transmit the command to the pet collar.

11. The method of claim 10, wherein the command comprises a force vector of a force to be applied to the pet via the collar.

12. The method of claim 11, wherein the force vector includes a strength of the force to be applied.

13. The method of claim 12, wherein the force vector includes a direction of the force to be applied.

* * * * *